(No Model.)
J. H. FERGUSON.
ART OF MAKING CURVED ELECTROTYPES OR STEREOTYPES FOR PRINTING.
No. 522,319. Patented July 3, 1894.
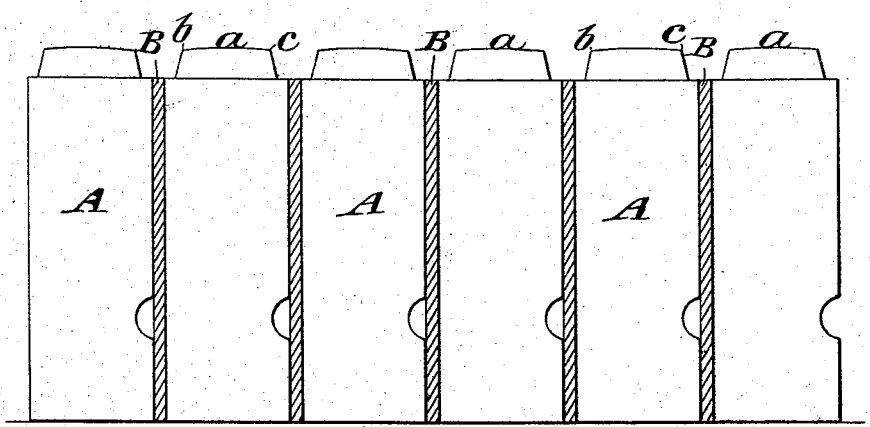
Fig. 1.
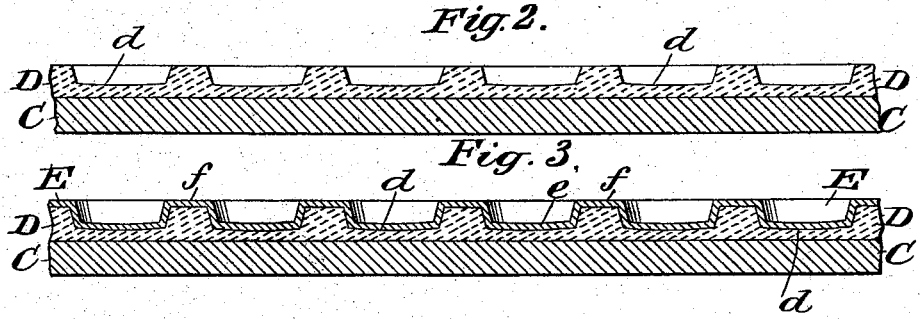
Fig. 2.
Fig. 3.
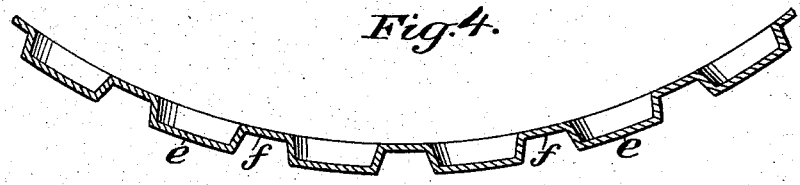
Fig. 4.
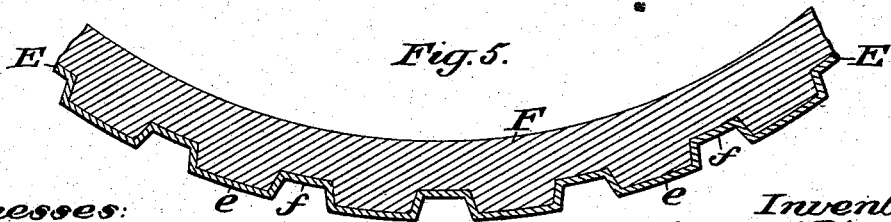
Fig. 5.
Witnesses:
C. Sundgren
George Barry
Inventor:
James H. Ferguson
by attorneys
Brown & Seward
THE NORRIS PETERS CO., PHOTO-LITHO., WASHINGTON, D. C.

United States Patent Office.

JAMES H. FERGUSON, OF BROOKLYN, ASSIGNOR OF ONE-FOURTH TO JOHN NESTOR, OF NEW YORK, N. Y.

ART OF MAKING CURVED ELECTROTYPES OR STEREOTYPES FOR PRINTING.

SPECIFICATION forming part of Letters Patent No. 522,319, dated July 3, 1894.

Application filed March 20, 1894. Serial No. 504,452. (No model.)

*To all whom it may concern:*

Be it known that I, JAMES H. FERGUSON, of Brooklyn, in the county of Kings and State of New York, have invented a new and useful Improvement in the Art of Making Curved Electrotypes and Stereotypes for Printing, of which the following is a specification.

For obtaining curved electrotypes and stereotypes it has been customary to use ordinary flat-faced type. Generally this type has been set in a flat form from which a flat mold of plastic material has been made and in this mold there has been produced by electro-deposition or casting a shell or plate the face of which corresponds with the face of the form and this shell or plate has afterward been bent to make it conform as nearly as practicable to the cylinder on which it is to be used. The shell or plate thus formed being much stiffer in the letters or printing surfaces than it is between them, the consequence is that when it is bent, the bending, especially when the type is small, takes place entirely or almost entirely between the said surfaces or letters so that the printing face instead of being cylindrical is polygonal. The consequence of this is that in printing, the edges of the letters or printing surfaces are subject to greater pressure and give a stronger impression than the portions between the edges and the type becomes worn out on the edges more rapidly than it would be if its face conformed to a cylindrical arc.

The object of my improvement is to obtain from movable type a curved electrotype or stereotype the printing faces of which will be cylindrical.

In carrying out my invention I employ for obtaining the mold for an electrotype or stereotype plate, movable type having their faces curved to correspond with the cylinder on which such plates are to be used and to present printing faces which constitute arcs of circles concentric with the axis of the cylinder. A plate or shell obtained in a mold produced from a flat form composed of movable type of this kind, when bent to the required curvature, will have the whole of its printing face in an arc concentric with the cylinder by reason of the bending taking place in the weaker parts between the letters or printing surfaces and of the curvature of the printing faces produced by the curvature of the movable type being retained.

Figure 1 represents a section of a portion of the form composed of movable type constructed for the carrying out of my invention, the section being taken parallel with the sides of the type. Fig. 2 represents a corresponding section of a portion of a flat electrotype mold taken from the form shown in Fig. 1. Fig. 3 represents a section corresponding with Fig. 2 of the same mold in which an electro-deposit has been obtained to form the shell for an electrotype. Fig. 4 represents a corresponding section of the shell after its removal from the mold and after it has been bent to conform to the cylinder on which it is to be used. Fig. 5 represents a similar section of the said shell with a backing of fusible metal which is commonly applied to such shells.

In Fig. 1, A A designate separate type having their faces curved as shown at *a*, between the edges *b* and *c* in the direction corresponding with the curvature of the cylinder, but only in that direction. The faces in the other direction are to be straight as in ordinary type.

B B are the leads between the lines of type.

In Figs. 2 and 3, C is the flat metal plate on which is the layer of wax D which has been impressed by the form of movable type to form the mold. This impression I obtain in the same way as in making a mold from a form of ordinary flat-faced type.

It will be seen in Fig. 2, that the impressions *d d* forming those portions of the mold in which the printing faces are to be obtained, are curved correspondingly with the curvature *a* of the faces of the type.

In Fig. 3, E is the electrotype shell which has been deposited in the mold in the usual way. It will be seen in this figure that the portions *e e* of this shell which have been deposited in the impressed portions *d* of the mold are correspondingly curved. The bending of the shell thus produced may be performed by any suitable means, such for instance, as those commonly employed in bending electrotype shells or plates.

In Fig. 4, it is illustrated that the bending to which the shell is subjected to give it the proper curvature to correspond with the cylinder on which it is to be used, has taken place in the parts $f$ between the printing faces $e\ e$, the latter retaining the same curvature as was given to them in the mold C D.

The backing F of fusible metal shown applied to the shell E in Fig. 5, may be applied to the shell after bending, or instead of bending the shell before applying said backing the said backing may be applied to the shell while in its flat condition and the plate consisting of the shell and the fusible backing may be bent.

What I claim as my invention is—

The improvement in the art of making curved electrotypes and stereotypes consisting in first obtaining a mold in plastic material from a flat form composed of separate types having curved faces, next obtaining in said mold a shell or plate having a face corresponding with said form, and afterward bending said shell or plate to the curvature required, substantially as herein set forth.

JAMES H. FERGUSON.

Witnesses:
GEORGE BARRY,
FREDK. HAYNES.